(12) United States Patent
Brown et al.

(10) Patent No.: US 7,096,470 B2
(45) Date of Patent: Aug. 22, 2006

(54) METHOD AND APPARATUS FOR IMPLEMENTING THREAD REPLACEMENT FOR OPTIMAL PERFORMANCE IN A TWO-TIERED MULTITHREADING STRUCTURE

(75) Inventors: Jeffrey Douglas Brown, Rochester, MN (US); Harold F. Kossman, Rochester, MN (US); Timothy John Mullins, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 10/246,912

(22) Filed: Sep. 19, 2002

(65) Prior Publication Data

US 2004/0060052 A1    Mar. 25, 2004

(51) Int. Cl.
*G06F 9/46* (2006.01)
*G06F 15/00* (2006.01)

(52) U.S. Cl. .................... 718/102; 712/1; 712/216; 712/228; 712/233

(58) Field of Classification Search ........ 718/100–108; 712/1, 216–228
See application file for complete search history.

(56) References Cited

U.S. PATENT DOCUMENTS

| | | | | |
|---|---|---|---|---|
| 5,692,192 A | * | 11/1997 | Sudo ..................... | 718/105 |
| 5,771,382 A | * | 6/1998 | Wang et al. ............ | 718/100 |
| 5,812,811 A | * | 9/1998 | Dubey et al. ........... | 712/216 |
| 5,815,727 A | * | 9/1998 | Motomura ............. | 712/1 |
| 5,872,963 A | * | 2/1999 | Bitar et al. ............. | 712/233 |
| 6,018,759 A | * | 1/2000 | Doing et al. ........... | 718/108 |
| 6,076,157 A | * | 6/2000 | Borkenhagen et al. ... | 712/228 |
| 6,105,051 A | * | 8/2000 | Borkenhagen et al. ... | 718/103 |
| 6,212,544 B1 | * | 4/2001 | Borkenhagen et al. ... | 718/103 |
| 6,223,208 B1 | * | 4/2001 | Kiefer et al. ........... | 718/108 |
| 6,418,460 B1 | * | 7/2002 | Bitar et al. ............. | 718/108 |
| 6,567,839 B1 | * | 5/2003 | Borkenhagen et al. ... | 718/103 |
| 6,662,204 B1 | * | 12/2003 | Watakabe et al. ...... | 718/107 |

(Continued)

FOREIGN PATENT DOCUMENTS

| | | |
|---|---|---|
| JP | 61-187116 | 8/1986 |
| JP | 08-164867 | 6/1996 |
| JP | 09-006007 | 1/1997 |

(Continued)

OTHER PUBLICATIONS

Shen et al., "Adaptive Two-Level Thread Management for Fast MPI Execution on Shared Memory Machines", ACM, 1999, pp. 1-19.*

(Continued)

*Primary Examiner*—Meng-Ai An
*Assistant Examiner*—Jennifer N. To
(74) *Attorney, Agent, or Firm*—Joan Pennington

(57) ABSTRACT

A method and apparatus are provided for implementing thread replacement for optimal performance in a two-tiered multithreading structure. A first tier thread state storage stores a limited number of runnable thread register states. A second tier thread storage facility stores a second number of thread states that is greater than the limited number of runnable thread register states. Each stored thread state includes predefined selection data. A runnable thread selection logic coupled between the first tier thread state storage and the second tier thread storage facility, uses the stored predefined selection data for selectively exchanging thread states between the first tier limited number of runnable thread register states and the second tier thread storage facility.

10 Claims, 2 Drawing Sheets

U.S. PATENT DOCUMENTS

| | | | | |
|---|---|---|---|---|
| 6,697,935 B1 * | 2/2004 | Borkenhagen et al. | ...... | 712/228 |
| 6,766,515 B1 * | 7/2004 | Bitar et al. | ................ | 718/100 |
| 6,785,889 B1 * | 8/2004 | Williams | .................... | 718/104 |
| 6,965,986 B1 * | 11/2005 | Kossman et al. | ........... | 712/228 |

FOREIGN PATENT DOCUMENTS

| JP | 09-194346 | 7/1997 |
|---|---|---|
| JP | 10-320759 | 11/1998 |
| JP | 2000-333724 | 10/2000 |

OTHER PUBLICATIONS

Kraiss et al., "Intergrated Document Caching and Prefetching in Storage Hierarchies Based on Markov-Chain Predictions", The VLDB Journal, 1998, pp. 141-162.*

U.S. Appl. No. 10/246,937, filed Sep. 19, 2002.

"Method and Apparatus for Implementing Two-Tiered Thread State Multithreading Support with High Clock Rate".

* cited by examiner

METHOD AND APPARATUS FOR IMPLEMENTING THREAD REPLACEMENT FOR OPTIMAL PERFORMANCE IN A TWO-TIERED MULTITHREADING STRUCTURE

RELATED APPLICATION

A related U.S. patent application Ser. No. 10/246,937, U.S. Pat. No. 6,965,986 B2 issued Nov. 15, 2005, and entitled "METHOD AND APPARATUS FOR IMPLEMENTING TWO-TIERED THREAD STATE MULTITHREADING SUPPORT WITH HIGH CLOCK RATE" by Harold F. Kossman, and Timothy John Mullins, and assigned to the present assignee is being filed on the same day as the present patent application.

FIELD OF THE INVENTION

The present invention relates generally to the data processing field, and more particularly, relates to a method and apparatus for implementing thread replacement for optimal performance in a two-tiered multithreading structure.

DESCRIPTION OF THE RELATED ART

Efficiency of hardware within the CPU is improved by dividing a processing task into independently executable sequences of instructions called threads. When the CPU, for any of a number of reasons, cannot continue the processing or execution of one of these threads, the CPU rapidly switches to and executes another thread. Multithreading is an effective way to improve the overall speed of a computer system or system throughput.

Multithreading design techniques have become an important means of enabling processor performance to scale up with clock frequency. Where past processor designs encountered stall conditions that degraded performance, multithreading allows continued execution of instructions by a separate parallel thread of activity. However, as clock frequencies continue to increase, more and more threads need to be supported in hardware to provide a continuously available option for execution by the processor.

Traditional hardware multithreading schemes provide for some number of thread states to be stored in hardware register sets. These register sets are generally implemented at relatively high chip design cost including chip area, circuit speed, and the like in the interest of achieving peak performance.

Alternative multithreading designs use more than one tier of state storage. For example, a first tier or first level state storage can be provided with high chip-resource cost but limited thread-holding capacity, and a second tier or second level state storage can be provided with additional thread capacity to support throughput need, but lower speed of access. Exchange of threads supported in second level state storage with those in first level state registers is necessary to enable threads to have opportunity to run on the processor. Simple hardware schemes could select a second level thread by way of a straightforward algorithm, such as, a round robin algorithm. Unfortunately, this generally leads to non-optimal overall performance, since proper scheduling of when threads are to run on the processor is required to fully leverage the throughput capability of the machine.

A need exists for a mechanism to solve the non-optimal performance problem by providing a method to pick the appropriate next thread from second level state storage for change with first level state registers.

SUMMARY OF THE INVENTION

A principal object of the present invention is to provide a method and apparatus for implementing thread replacement for optimal performance in a two-tiered multithreading structure. Other important objects of the present invention are to provide such method and apparatus for implementing thread replacement for optimal performance in a two-tiered multithreading structure substantially without negative effect and that overcome many of the disadvantages of prior art arrangements.

In brief, a method and apparatus are provided for implementing thread replacement for optimal performance in a two-tiered multithreading structure. A first tier thread state storage stores a limited number of runnable thread register states. A second tier thread storage facility stores a second number of thread states that is greater than the limited number of runnable thread register states. Each stored thread state includes predefined selection data. A runnable thread selection logic coupled between the first tier thread state storage and the second tier thread storage facility, uses the stored predefined selection data for selectively exchanging thread states between the first tier limited number of runnable thread register states and the second tier thread storage facility.

In accordance with features of the invention, the stored predefined selection data used by the runnable thread selection logic for selectively exchanging thread states between the first tier runnable thread register states and the second tier thread storage facility includes specific thread historical usage data. The stored predefined selection data used by the runnable thread selection logic includes processor cycle usage efficiency for each particular thread. The stored predefined selection data includes a time since the particular thread ran on the processor that is used to signal a starvation condition by the runnable thread selection logic. The stored predefined selection data includes thread system priority to enable the runnable thread selection logic to obey system policies and select a higher priority thread over lower priority thread to move into the first tier runnable thread register states. The stored predefined selection data includes a ready-to-run indicator so that a stalled thread maintained in the secondary thread storage facility does not become activated until its stalled condition is resolved. The stored predefined selection data is used by ranking logic for ranking runnable threads to be maintained in the first tier runnable thread register states. The first tier runnable thread register states are available for selection when a currently executing processor state is changed at idle events.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
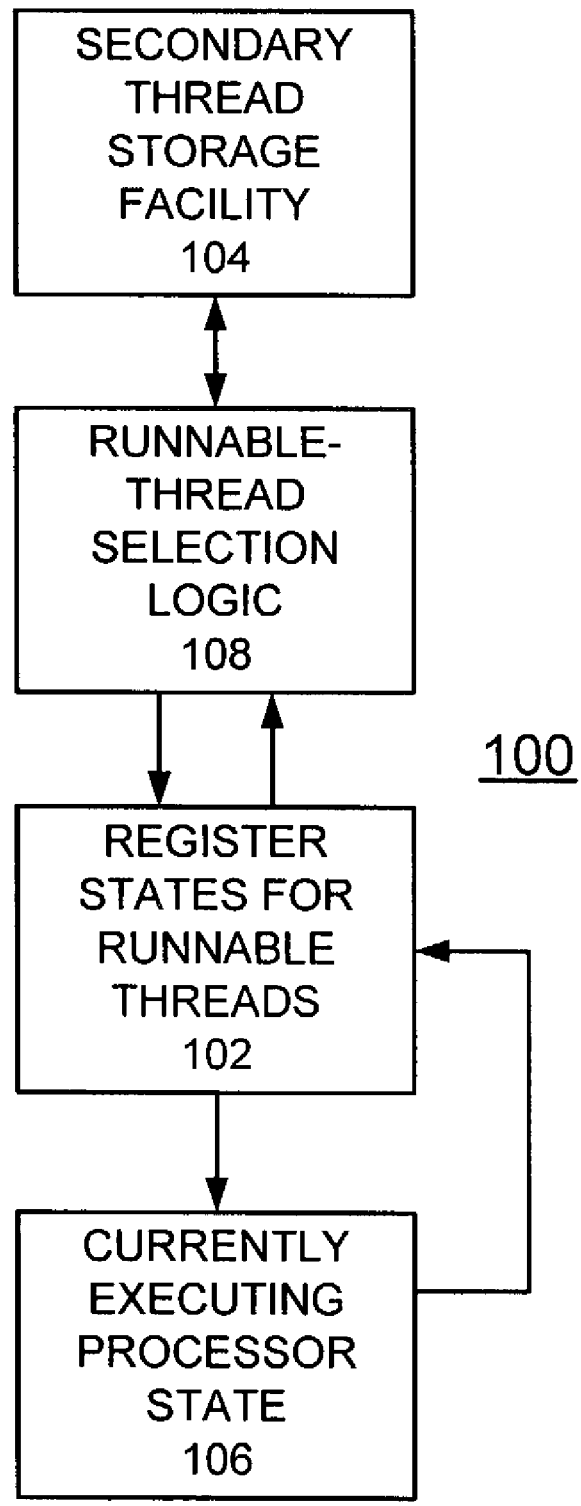
FIG. 1 is a block diagram of a two-tiered multithreading selection structure in accordance with the preferred embodiment.

Having reference now to the drawings, in FIG. 1, there is shown a multithreading selection structure generally designated by the reference character 100 of the preferred embodiment. Multithreading selection structure 100 includes two tiers of thread state storage generally designated by 102 and 104. The first-tier thread state storage 102 is high-speed logic, optimized for fast clock rate. The first-tier thread state storage 102 includes a limited number of runnable register states for runnable threads that can be accessed for execution on the processor. The limited number of runnable register states is less than a particular threshold value to avoid the penalty to clock rate that can occur when the number of register logic replications grows beyond the particular threshold. The second-tier thread state storage 104 optionally is a moderate-speed logic, operating at a lower speed than the high-speed logic of the first-tier state storage 102. The second-tier thread state storage 104 provides capacity to hold state information for a full, total number of threads needing hardware support to achieve peak performance. Only runnable threads stored in the first-tier runnable register states 102 can be selected to run next when a currently executing processor state 106 is changed at idle events. Threads with state present only in the second tier 104 are not able to use the processor, but are available for quick selection by a runnable-thread selection logic 108.

In accordance with features of the preferred embodiment, optimal multithreading performance is provided by increasing the information saved with a thread state. Predefined selection data is stored with the thread state that is used for selectively exchanging thread states between the first tier runnable thread register states 102 and the second tier thread storage facility 104. By referencing this saved selection data, the runnable-thread selection logic 108 can choose the proper thread to move into position in the first-tier runnable register states 102 for running on the processor. In particular, past history about a specific thread usage of the processor resources 106 is maintained and used to rank thread choices.

Figure 2:
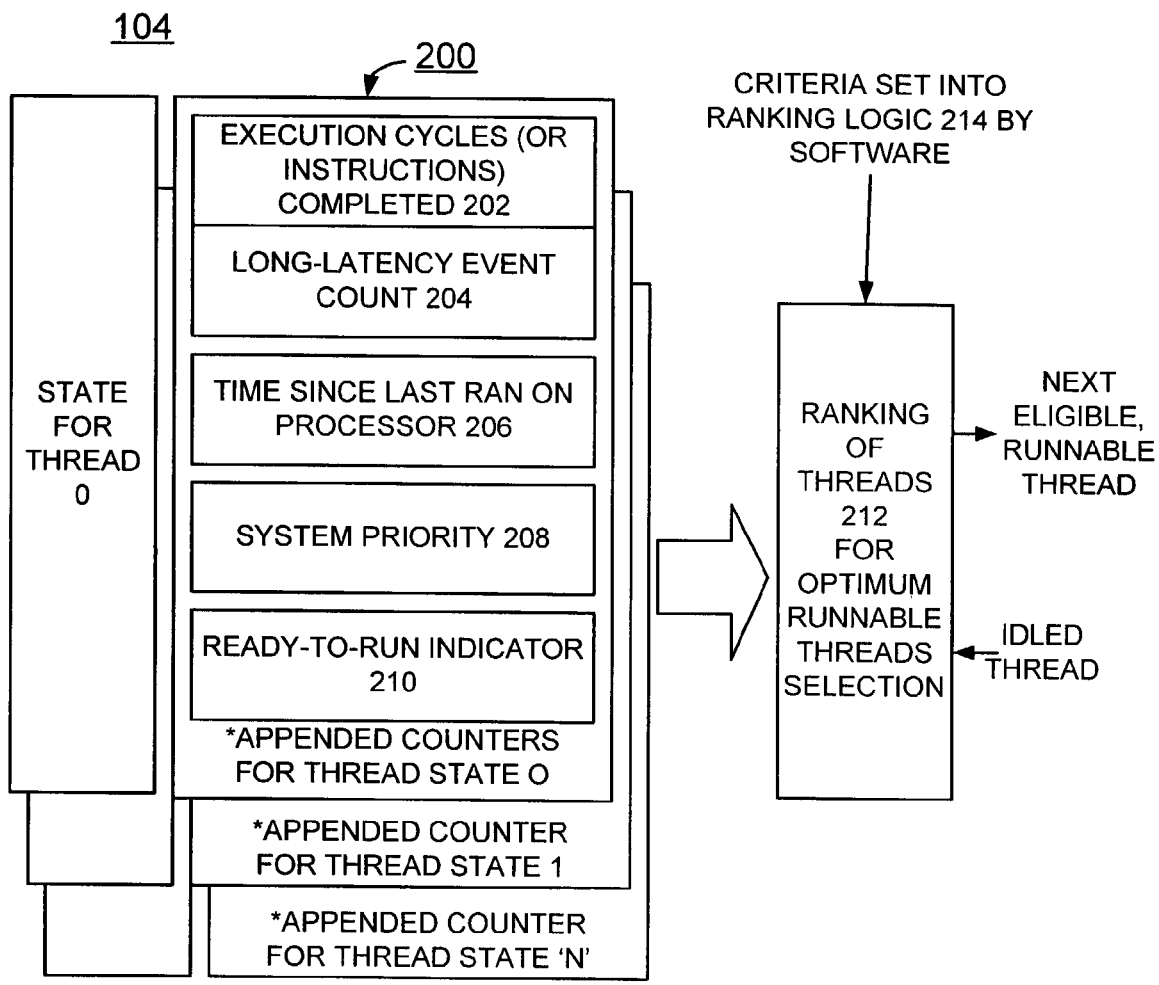
FIG. 2 is a block diagram illustrating operation of a runnable-thread selection logic using stored predefined selection data in accordance with the preferred embodiment.

Referring now to FIG. 2, additional thread information or predefined selection data 200 is saved in the secondary thread storage facility 104 in accordance with the preferred embodiment. The predefined selection data 200 includes processor cycle usage efficiency. Threads that frequently encounter processor stall conditions while executing cause inefficiency in the usage of processor resources. Things like cache misses and other long latency events contribute to these inefficiencies. It is generally desirable to schedule the most efficient threads for execution on the processor ahead of less efficient threads. The predefined selection data 200 includes execution cycle counters 202 to keep track of processor cycles (or instructions) that occur while a particular thread is active, and long latency event counters 204 to keep track of long latency events encountered by an executing thread. This ratio of long latency events per cycle (or per instruction) establishes an efficiency metric. The higher the ratio, the more a thread has shown inefficiency in its use of the processor. Threads with the lowest such efficiency metric ratio are the most desirable to select to run next on the processor.

Predefined selection data 200 includes a time since the specific thread last ran on the processor 206. A timestamp 206 stored with the thread state enables the runnable-thread selection logic 108 to determine how long threads have been inactive on the processor. If a threshold value is exceeded, a starvation condition is signaled for the particular thread, and the particular thread can be given special priority to ensure running on the processor despite other decision criteria that would keep it inactive.

Predefined selection data 200 includes a system priority 208. System algorithms often need to set policies regarding which threads are to receive favorable treatment in case of contention for system resources. Keeping system priority 208 in the thread state allows the runnable-thread selection logic 108 to obey such system policies and select high-priority threads for running on the processor when they might otherwise be held out of runnable state.

Predefined selection data 200 includes a ready-to-run indicator 210. At higher processor clock frequencies, there are many threads supported in hardware that are enabled to use the processor when an opportunity arises to start a new execution. Threads that reach a stall point and switch out of active execution 106 need to have state maintained in the first tier runnable thread register states 102 or in the second tier thread storage facility 104 and contend again for run cycles once the stall is resolved. While such threads are stalled and may have state saved only in the second tier thread storage facility 104, they need to be bypassed by the runnable-thread selection logic 108. The ready-to-run indicator 210 is kept in their thread state to signal the selection logic not to spend machine cycles evaluating the particular state for runnability, but to move on to other threads for assessment. This ready-to-run indicator 210 is reset when the stall condition is resolved, enabling the thread to be runnable again.

Ranking of threads 212 is performed using specified criteria set into ranking selection logic 214, for example, set by software. To allow for flexibility in selecting a single thread from among several candidate threads from the second tier thread storage facility 104, additional opportunity is given to system software to establish an evaluation sequence using the predefined selection data 200 for the thread state metrics. Ranking selection logic 214 performs selection logic functions and evaluates the relative ranking of the threads for each metric, for example, picking the single thread that has the highest overall ranking. For example, the ranking selection logic 214 could be set up by software to pick a ready-to-run thread that has the highest starvation time exceeding threshold, at the highest system priority, with the lowest long latency count per cycle. In case of no threads meeting current criteria, the most significant selection attribute would be skipped in a next re-evaluation. In case of multiple threads meeting the current criteria, a random choice could be made.

By incorporating the predefined selection data 200 in the saved state for threads supported by processor hardware, runnable thread selection logic 108 determines the most suitable choice for exchanging a currently active thread with an inactive thread. As a runnable thread becomes inactive due to a stall condition, processor resources are managed efficiently by substituting another selection, with optimal operating history, in the active first-tier runnable register states for runnable threads. This provides for peak possible performance by the multithreaded processor, avoiding degradations in efficiency that limit the performance of current state-of-the art hardware management schemes.

While the present invention has been described with reference to the details of the embodiments of the invention shown in the drawing, these details are not intended to limit the scope of the invention as claimed in the appended claims.

What is claimed is:

1. Apparatus for implementing thread replacement for optimal performance in a two-tiered multithreading structure comprising:
   a first tier thread state storage for storing a limited number of runnable thread register states;
   a second tier thread storage facility for storing a second number of thread states; said second number of thread states being greater than the limited number of runnable thread register states;
   each stored thread state including predefined selection data; said predefined selection data including predefined historical thread usage data; said predefined selection data includes processor cycle usage efficiency data for each specific thread; said processor cycle usage efficiency data including a ratio of latency events per processor cycle, where a higher ratio indicates more inefficiency of historical thread use of a processor; and
   a runnable thread selection logic coupled between the first tier thread state storage and the second tier thread storage facility, for selectively exchanging thread states between the first tier limited number of runnable thread register states and the second tier thread storage facility using said stored predefined selection data.

2. Apparatus for implementing thread replacement for optimal performance in a two-tiered multithreading structure as recited in claim 1 wherein said predefined selection data includes a time value since a particular thread ran on a processor, said time value being used to signal a starvation condition when said time value exceeds a threshold value.

3. Apparatus for implementing thread replacement for optimal performance in a two-tiered multithreading structure as recited in claim 1 wherein said predefined selection data includes a thread system priority; said thread system priority used by said runnable thread selection logic for selecting threads having high system priority before threads having lower system priority.

4. Apparatus for implementing thread replacement for optimal performance in a two-tiered multithreading structure as recited in claim 1 wherein said predefined selection data includes a ready-to-run indicator, said ready-to-run indicator used by said runnable thread selection to prevent threads in a stalled state from being moved from said secondary thread storage facility to the first tier thread register states far runnable threads until the stalled state is resolved.

5. Apparatus for implementing thread replacement for optimal performance in a two-tiered multithreading structure as recited in claim 1 includes ranking logic for ranking runnable threads in said first tier thread state storage; and said ranking logic using said stored predefined selection data for selecting a next eligible, runnable thread to be executed on a processor run next when a currently executing processor state is changed at idle events.

6. A method for implementing thread replacement for optimal performance in a two-tiered multithreading structure comprising:
   utilizing first-tier state storage logic optimized for the high clock rate, storing a limited number of runnable thread register states;
   utilizing a second tier storage facility, storing state and predefined selection data for a second number of thread states including storing said predefined selection data including processor cycle usage efficiency data for each specific thread; said processor cycle usage efficiency data including a ratio of latency events per processor cycle, where a higher ratio indicates more inefficiency of a historical thread use of a processor; said second number of thread states being greater then said limited number of runnable thread register states and equal to all threads to run on a processor; said predefined selection data including predefined historical thread usage data; and
   utilizing runnable thread selection logic, processing said stored predefined selection data for each of said threads; and selectively exchanging thread states between said first tier state storage logic and said second tier storage facility based upon said predefined selection data.

7. A method for implementing thread replacement for optimal performance in a two-tiered multithreading structure as recited in claim 6 wherein the step utilizing said second tier storage facility, of storing said state and said predefined selection data for a second number of thread states includes the steps of storing said predefined selection data including a time value since a particular thread ran on a processor, said time value being, used to signal a starvation condition when said time value exceeds a threshold value.

8. A method for implementing thread replacement for optimal performance in a two-tiered multithreading structure as recited in claim 6 wherein the step utilizing said second tier storage facility, of storing said state and said predefined selection data for a second number of thread states includes the steps of storing said predefined selection data including a thread system priority; said thread system priority used by said runnable thread selection logic to enable selecting threads having high system priority over threads having lower system priority.

9. A method for implementing thread replacement for optimal performance in a two-tiered multithreading structure as recited in claim 6 wherein the step utilizing said second tier storage facility, of storing said state and said predefined selection data for a second number of thread states includes the steps of storing said predefined selection data including a ready-to-run indicator, said ready-to-run indicator used by said runnable thread selection logic to prevent threads in a stalled state from being moved from said secondary thread storage facility to the first tier thread register states for runnable threads until the stalled state is resolved.

10. A method for implementing thread replacement for optimal performance in a two-tiered multithreading structure as recited in claim 6 includes the step of ranking runnable threads in said first tier runnable thread register states using said predefined selection data to select a runnable thread to be executed next on a processor when a currently executing processor state is changed at idle events.

* * * * *